(12) United States Patent
Simpson et al.

(10) Patent No.: US 11,300,785 B2
(45) Date of Patent: Apr. 12, 2022

(54) HEAD-UP DISPLAY (HUD) MIRROR ASSEMBLY AND HOUSING

(71) Applicants: DENSO International America, Inc., Southfield, MI (US); Denso Corporation, Kariya (JP)

(72) Inventors: Austin Simpson, Detroit, MI (US); Yusuke Matsui, West Bloomfield, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 812 days.

(21) Appl. No.: 16/032,749

(22) Filed: Jul. 11, 2018

(65) Prior Publication Data

US 2020/0018951 A1    Jan. 16, 2020

(51) Int. Cl.
*G02B 27/01* (2006.01)
*B60R 1/12* (2006.01)
*B60K 35/00* (2006.01)

(52) U.S. Cl.
CPC .......... *G02B 27/0101* (2013.01); *B60K 35/00* (2013.01); *B60R 1/12* (2013.01); *G02B 27/0149* (2013.01); *B60K 2370/334* (2019.05); *B60R 2300/205* (2013.01)

(58) Field of Classification Search
CPC ............ G02B 27/0101; G02B 27/0149; B60K 35/00; B60R 1/12; B60R 2011/0033; B60R 2011/0052; B60R 2011/008; B60R 2011/0084; B60R 2300/205
See application file for complete search history.

(56) References Cited

U.S. PATENT DOCUMENTS

| 3,934,489 A | * | 1/1976 | Bottrill | B60R 1/068 74/502.1 |
|---|---|---|---|---|
| 5,572,342 A | | 11/1996 | Higuchi et al. | |
| 9,829,704 B2 | | 11/2017 | Nambara | |
| 2015/0055098 A1 | * | 2/2015 | Ishibashi | G02B 27/0149 353/14 |

FOREIGN PATENT DOCUMENTS

| JP | 2011131651 A | 7/2011 |
|---|---|---|
| JP | 2017144847 A | 8/2017 |

* cited by examiner

*Primary Examiner* — Alicia M Harrington
(74) *Attorney, Agent, or Firm* — Dickinson Wright PLLC

(57) ABSTRACT

A heads-up display (HUD) mirror housing. The HUD mirror housing includes a peripheral frame portion extending along a longitudinal axis, a rear body portion connected to the peripheral frame portion connected to each other to house a mirror such that a reflective surface of the mirror is exposed, and first and second pegs extending away from the peripheral frame portion and extending along the longitudinal axis. In this embodiment, the first peg has a first bearing surface configured to bear against a first bracket mounting slot when the HUD mirror housing is in an assembled configuration.

18 Claims, 4 Drawing Sheets

HEAD-UP DISPLAY (HUD) MIRROR ASSEMBLY AND HOUSING

TECHNICAL FIELD

The disclosure relates a heads-up display (HUD) mirror assembly for a vehicle, and more specifically, a HUD mirror assembly including a concave mirror.

BACKGROUND

A heads-up display (HUD) device can be used in a vehicle to display a virtual image visually recognizable by a vehicle occupant. The virtual image can be projected from a concave mirror, which is part of the HUD device. The concave mirror can be part of an assembly, which is mounted behind the instrument panel of the vehicle. Alignment of the concave mirror within the concave mirror assembly is important to maintain proper operation of the HUD device.

SUMMARY

A heads-up display (HUD) mirror assembly is disclosed in an embodiment. The HUD mirror assembly includes a mirror having front and rear surfaces and extending along a longitudinal axis. The HUD mirror assembly also includes a housing having a peripheral frame portion and a rear body portion connected to each other to house the mirror such that the front surface of the mirror is exposed. The first and second pegs extend away from the peripheral frame portion and extend along the longitudinal axis. The HUD mirror assembly further includes a bracket having first and second mounting portions including first and second slots, respectively, and a supporting arm extending therebetween. The HUD mirror assembly also includes a tension spring and a torsion spring. The tension spring is attached to the rear body portion and the supporting arm. The torsion spring exerts a holding force on the housing along the longitudinal axis from the second peg toward the housing. The first peg bears on the first slot on a bearing surface of the first peg when the mirror assembly is in first and second assembled configurations.

A heads-up display (HUD) mirror housing is disclosed in another embodiment. The HUD mirror housing includes a peripheral frame portion extending along a longitudinal axis, a rear body portion connected to the peripheral frame portion connected to each other to house a mirror such that a reflective surface of the mirror is exposed, and first and second pegs extending away from the peripheral frame portion and extending along the longitudinal axis. In this embodiment, the first peg has a first bearing surface configured to bear against a first bracket mounting slot when the HUD mirror housing is in an assembled configuration.

A method of assembling a heads-up display (HUD) mirror assembly is disclosed in yet another embodiment. The HUD mirror assembly includes a mirror having front and rear surfaces extending along a longitudinal axis, a housing having a peripheral frame portion and a rear body portion connected to each other to house the mirror such that the front surface of the mirror is exposed, and first and second pegs extending away from the peripheral frame portion and extending along the longitudinal axis, and a bracket having first and second mounting portions including first and second slots, respectively, and a supporting arm extending therebetween, the first slot having a major axis and a minor axis. The method includes translating the housing in a downward, vertical direction along the major axis such that the first peg becomes seated on a lower surface of the first slot, and translating the housing in a lateral direction along the longitudinal axis and away from the bracket such that a bearing surface of the first peg becomes seated on the rear surface of the first slot.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
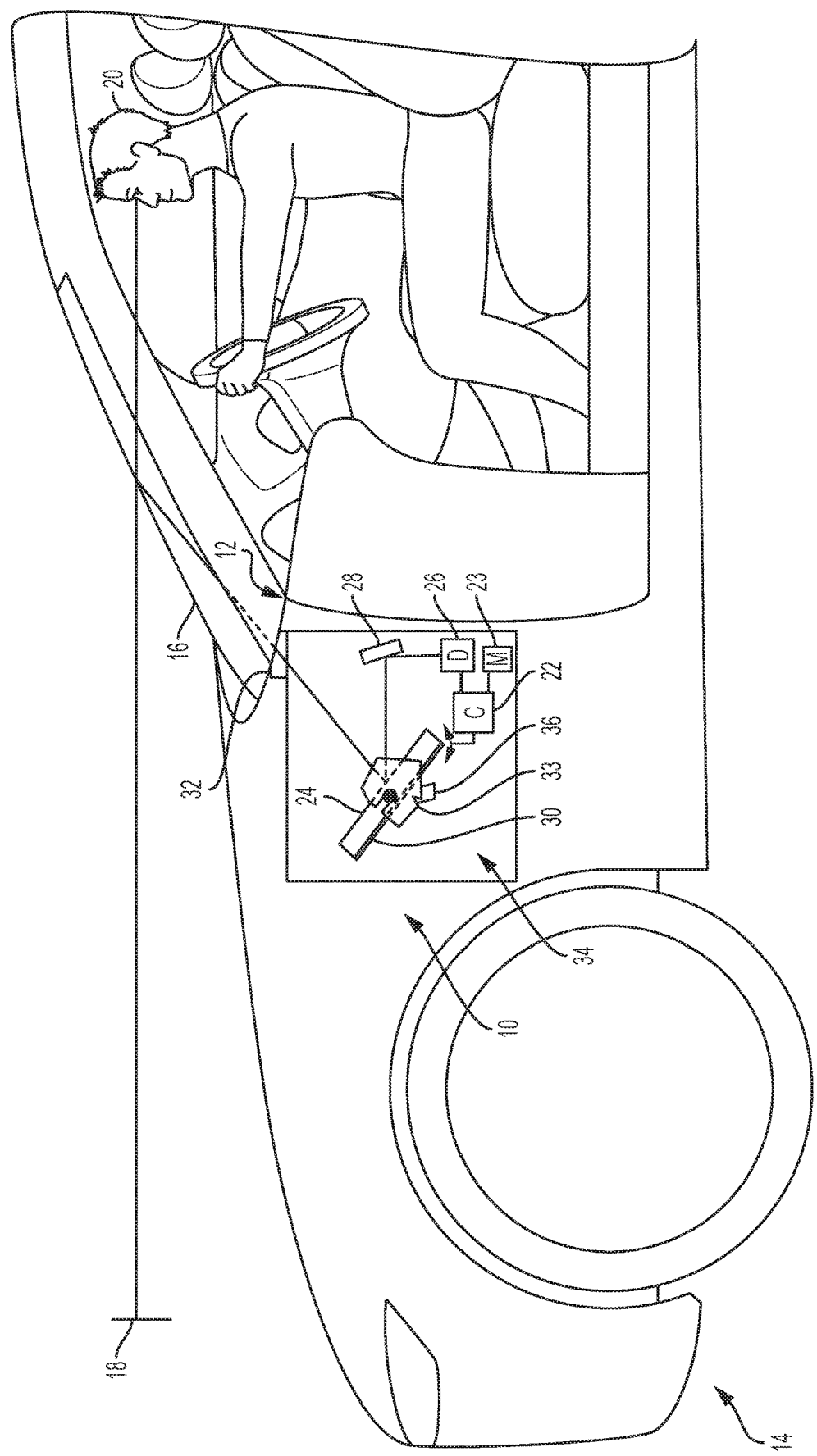
FIG. 1 depicts a schematic view of a heads-up display device according to an embodiment.

FIG. 1 depicts a schematic view of heads-up display (HUD) device 10 according to an embodiment. HUD device 10 is situated within instrument panel 12 of vehicle 14. HUD device 10 projects an image onto windshield 16 of vehicle 14. The windshield 16 is configured to project the image as a virtual image 18 visually recognizable by a vehicle occupant 20. The virtual image 18 may include various information recognizable by vehicle occupant 20. Non-limiting examples of such information include vehicle state information, for instance, vehicle speed, fuel efficiency, remaining fuel, distance until empty, and average miles per gallon, and vehicle environment information, for instance, external temperature, internal temperature, weather information, road condition information, and navigation information.

HUD device 10 includes controller 22 configured to perform instructions, commands, and other routines stored in memory 23 to support the functionality of HUD device 10 as disclosed herein. The instructions, commands, and other routines performed by controller 22 may be stored in memory 23 in a non-volatile manner using any suitable processor-readable medium or storage, including any non-transitory medium. In one or more embodiments, controller 22 is configured to execute instructions to change the angle or orientation of mirror 24 of HUD device 10 relative to windshield 16 based on signals received from controller 22. In one or more embodiments, controller 22 is configured to execute instructions to transmit signals to display instrument 26. Display instrument 26 may be a laser scanner. Other non-limiting examples of display instruments include display instruments that use thin film transistor (TFT) or digital light processing (DLP) technology. As shown in FIG. 1, a laser scanner, as an example of display instrument 26, is configured to convert the signals into images projected onto screen 28. Screen 28 is configured to project the images received from display instrument 26 onto mirror 24. Mirror 24 is configured to project the images received from screen 28 through medium 32 and onto windshield 16, which in turn, generates virtual image 18. Medium 32 may be an opening formed in instrument panel 12 or it may be a transparent window mounted within an opening in instrument panel 12.

During assembly of HUD device 10, mirror 24 is mounted into housing 30. The integrated unit of mirror 24 and housing 30 is mounted onto bracket 33. Mirror 24, housing 30, and bracket 33 may be collectively referred to as mirror assembly 34. Mirror assembly 34 may further include driving unit 36 configured to change the angle or orientation of mirror 24 relative to windshield 16 based on signals received from controller 22.

Figure 2:
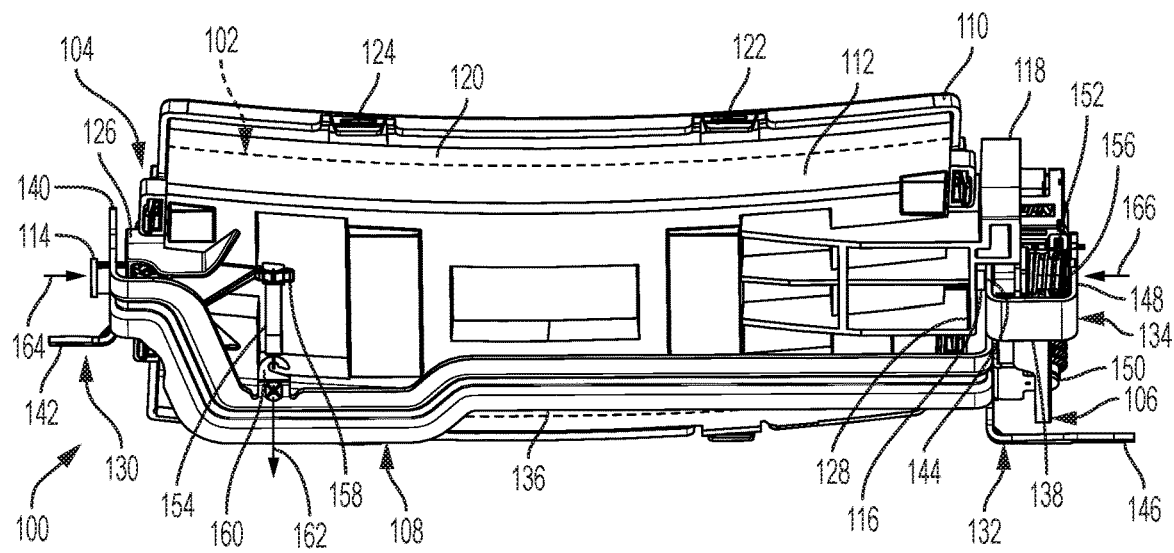
FIG. 2 depicts a rear view of a mirror assembly according to an embodiment.

FIG. 2 depicts a rear view of mirror assembly 100 according to an embodiment. Mirror assembly 100 includes mirror 102, housing 104, driving unit 106, and bracket 108. In one or more embodiments, mirror 102 is a concave mirror. Mirror 102 includes a front surface and an opposing rear surface. While not shown in FIG. 2 because they are obscured by housing 104, the front surface faces into the page and the rear surface faces out of the page and faces housing 104. The front surface includes a reflective material to reflect images projected onto mirror 102 from screen 28 onto windshield 16.

Housing 104 is configured to house mirror 102. Housing 104 may be fabricated of a molded polymeric material having requisite strength to house and support mirror 102. Housing 104 includes peripheral frame portion 110, rear body portion 112, first side peg 114, second side peg 116, and mounting portion 118. Peripheral frame portion 110 of housing 104 at least partially covers peripheral edge 120 of mirror 102. Rear body portion 112 of housing 104 at least partially covers the rear surface of mirror 102. A number of catches, for example, catch 122, are formed in peripheral frame portion 110 of housing 104. A number of stops, for example, stop 124, are formed in rear body portion 112 of housing 104. In other embodiments, the number of catches may be formed in rear body portion 112 and the number of stops may be formed in peripheral frame portion 110. Corresponding catches and stops mate to each other to attach peripheral frame portion 110 and rear body portion to retain mirror 102 therein. First side peg 114 projects outwardly and integrally from first side wall 126 of rear body portion 112. Second side peg 116 projects outwardly and integrally from second side wall 128 of rear body portion 112. Mounting portion 118 extends from second side wall 128 of rear body portion.

Bracket 108 includes first mounting portion 130, second mounting portion 132, third mounting portion 134, first supporting arm 136 extending between first and second mounting portions 132 and 134, and second supporting arm 138 extending between second and third mounting portions 132 and 134. Bracket 108 may be fabricated of a stamped metal alloy having requisite strength to support housing 104. First mounting portion 130 includes first vertical portion 140 and first horizontal portion 142. First horizonal portion 142 includes a number of apertures (not shown) for mounting bracket 108 to a mounting surface within instrument panel 12. In one or more embodiments, first horizontal portion 142 is mounted such that it is at least substantially parallel to driving surface 38 of vehicle 14, but in other embodiments, the mounting angle is not substantially parallel to driving surface 38 of vehicle 14. Second mounting portion 132 includes second vertical portion 144 and second horizontal portion 146. Second horizontal portion 146 includes a number of apertures (not shown) for mounting bracket 108 to a mounting surface within instrument panel 12. In one or more embodiments, second horizontal portion 146 is mounted such that it is at least substantially parallel to driving surface 38 of vehicle 14, but in other embodiments, the mounting angle is not substantially parallel to driving surface 38 of vehicle 14. Second vertical portion 144 is configured to mount driving unit 106 to mounting bracket 108. Third mounting portion 134 includes a third vertical portion 148.

Driving unit 106 includes a motor for driving a pinion that engages teeth on rack 150. Rotational movement of the pinion causes rack 150 to move in an arcuate path relative to the pinion. Rack 150 is connected to peg 152 of driving unit 106. Peg 152 is in communication with second side peg 116 of housing 104. Because peg 152 and rack 150 are connected, peg 152 is in communication with second side peg 116 of housing 104, and housing 104 and mirror 102 are connected, movement of rack 150 along the arcuate path causes rotational movement of second side peg 116, which makes mirror 102 change in orientation angle relative to first and second horizontal portions 142 and 146 of bracket 108. A motor is configured to receive signals transmitted by controller 22 to instruct the motor to drive the pinion in either a first or second rotational direction. The pinion and rack 150 are adapted to mesh with each other so that the rotational movement of the pinion is translated properly to rack 150. This rotational movement may not be properly translated if the pinion and rack 150 are not properly meshed during operation of mirror assembly 100.

First vertical portion 140 of first mounting portion 130 includes a first slot configured to receive first side peg 114 of mirror assembly 100. In the assembled state, first side peg 114 is received within the first slot as further described herein and depicted in the figures. Second vertical portion 144 of second mounting portion 132 includes a second slot configured to receive second side peg 116. Third vertical portion 148 of third mounting portion 134 includes a third slot for receiving peg 152 of driving unit 106. The surface of rack 150 opposing peg 152 abuts mounting portion 118 of housing 104. Mounting portion 118 also includes an aperture to receive a portion extending from this rack surface so that it is in communication with the second side peg 116. In this assembled configuration, driving unit 106 and housing 104 (including mirror 102) move together relative to bracket 108 through rotational movement of first and second side pegs 114 and 116 and driving unit peg 152 when these pegs are driven by driving unit 106.

In one or more embodiments, tension spring 154 and torsion spring 156 are configured to maintain mirror assembly 100 in a functioning condition when in the assembled configuration. Tension spring 154 includes first and second hook ends and a coil extending therebetween. Rear body portion 112 includes notch 158 configured to receive the first hook end of tension spring 154 when the mirror assembly 100 is in the assembled configuration. First supporting arm 136 of bracket 108 includes tab 160 including an aperture configured to receive the second hook end of tension spring 154 when the mirror assembly 100 is in the assembled configuration. In the assembled configuration, tension spring 154 exerts a force along the longitudinal axis of tension spring 154, as depicted by arrow 162, and as described in greater detail below. This force is configured to counteract unintended movement of mirror 102 in directions at least partially opposite this force.

Torsion spring 156 includes first and second linear end and a coil extending therebetween. In the assembled configuration, peg 152 of driving unit 106 is seated within the coil of torsion spring 156. First linear end of torsion spring is contained within an aperture formed on third vertical portion 148 of third mounting portion 134 of bracket 108. In the assembled configuration, torsion spring 156 is disposed between mounting portion 118 of housing 104 and third vertical portion 148 of third mounting portion 134 of bracket 108. As described in greater detail below, torsion spring 156 is configured to maintain housing 104, including first side peg 114, in a proper lateral orientation relative to bracket 108 by limiting the effect of torsion and linear forces on mirror assembly 100.

Figure 3:
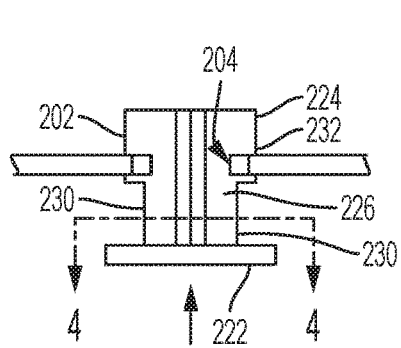
FIG. 3 depicts a fragmented, top view of first side peg and slot of a mirror assembly in an intended assembled configuration according to an embodiment.
Figure 4:
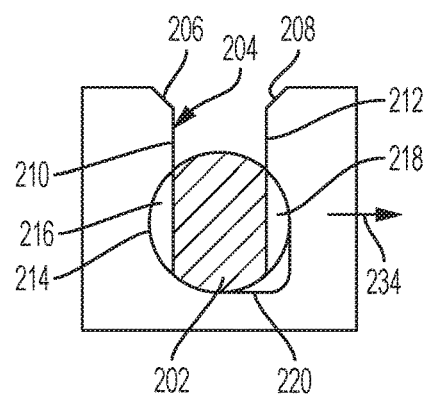
FIG. 4 depicts a partial, cross-section view of first side peg and slot of the mirror assembly in the intended assembled configuration shown in FIG. 3.
Figure 5:
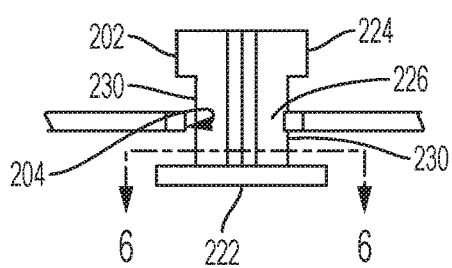
FIG. 5 depicts a fragmented, top view of first side peg and slot of the mirror assembly in an unintended assembled configuration according to an embodiment.
Figure 6:
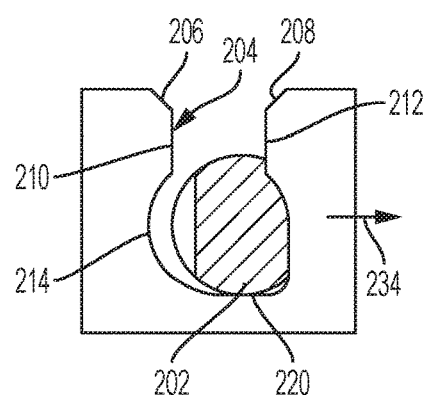
FIG. 6 depicts a partial, cross-section view of first side peg and slot of the mirror assembly in the unintended assembled configuration shown in FIG. 5.
Figure 7:
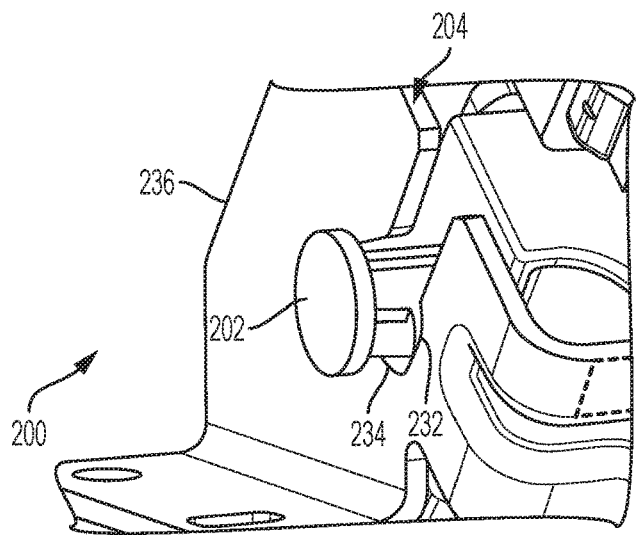
FIG. 7 depicts a perspective, side view of first side peg and slot in the intended assembled configuration shown in FIG. 3.

FIGS. 3-7 depict mirror assembly 200 according to an embodiment. These figures depict the interaction between first side peg 202 and slot 204 when mirror assembly 200 is in the assembled configuration. FIG. 3 depicts a fragmented, top view of first side peg 202 and slot 204 in an intended assembled configuration. FIG. 4 depicts a partial, cross-section view of first side peg 202 and slot 204 in the intended assembled configuration. FIG. 5 depicts a fragmented, top view of first side peg 202 and slot 204 in an unintended assembled configuration. FIG. 6 depicts a partial, cross-section view of first side peg 202 and slot 204 in the unintended assembled configuration. FIG. 7 depicts a perspective, side view of first side peg 202 and slot 204 in the intended assembled configuration.

As shown in FIGS. 3, 4, and 7, first side peg 202 is seated within slot 204 in the intended assembled configuration. Slot 204 includes opposing first and second upper chamfered portions 206 and 208 connecting to first and second upper side portions 210 and 212, respectively. The ends of arcuate lower portion 214 of slot 204 terminate at upper side portions 210 and 212. The chamfered portions 206 and 208, and side portions 210 and 212 are configured to guide first side peg 202 along a downward, vertical path toward arcuate lower portion 214 during the process of assembling mirror assembly 200. Arcuate lower portion 214 includes first and second circular segments 216 and 218, which are joined by a rectangular segment 220.

First side peg 202 includes end cap 222, base portion 224, and slotted portion 226 extending between end cap 222 and base portion 224. End cap 222 may be circular in shape. Base portion 224 may also be circular in shape. As depicted in the Figures, slotted portion 226 includes first and second slots 228 and 230, each bounded by a portion of end cap 222, base portion 224, and slotted portion 226. The lower surface of each slot 228 and 230 may be planar. In other embodiments, the lower surface of each slot 228 and 230 may be arcuate.

In the intended assembled configuration, as shown in FIGS. 3, 4, and 7, bearing surface 232 of first side peg 202 rests on slot 204. In an unintended assembled configuration, a high lateral impact force (e.g., greater than or equal to 8 G, while this threshold may vary for different designs), as shown by arrow 164 of FIG. 2, causes mirror assembly 200 to shift in a lateral direction and to fall of bearing surface 232. Under this condition, the force of tension spring 154, as shown by arrow 162 of FIG. 2, may prevent mirror assembly 202 from returning to the intended assembled position. Arrow 234 of FIG. 7 shows the component of the tension spring force that is acting in the x-direction relative to the outer surface of first supporting arm 236. There is also a force component in the y-direction, which is not shown in this figure. In the unintended assembled configuration, the pinion and rack 150 of driving unit 106 may not be properly meshed, causing a malfunction in the operation of mirror 102. The unintended assembled configuration is shown in FIGS. 5 and 6. Instead of first side peg 202 resting on slot 204 on bearing surface 232, first side peg 202 rests on slot 204 on first slot 228.

Figure 8:
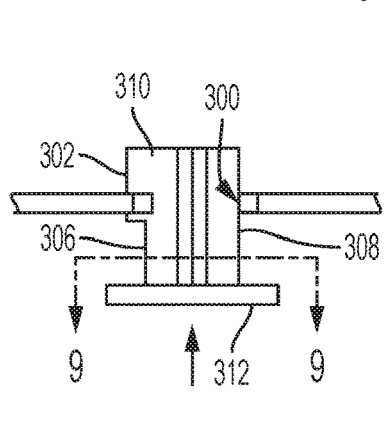
FIG. 8 depicts a fragmented, top view of first side peg and slot of a mirror assembly in a first assembled configuration according to an embodiment.
Figure 9:
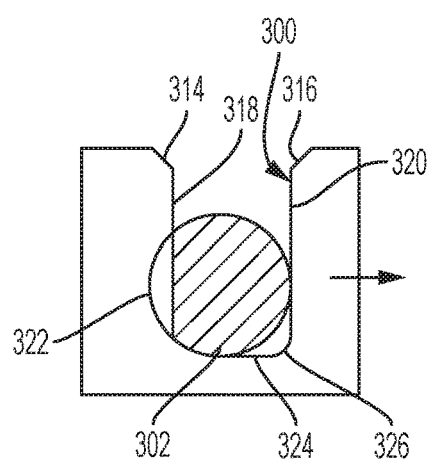
FIG. 9 depicts a partial, cross-section view of first side peg and slot of the mirror assembly in the first assembled configuration as shown in FIG. 8.
Figure 10:
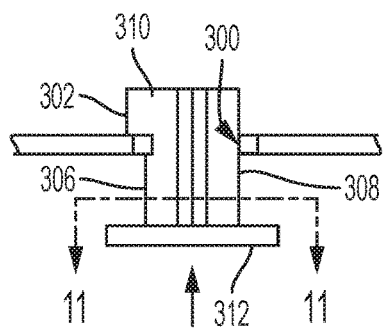
FIG. 10 depicts a fragmented, top view of first side peg and slot of the mirror assembly in a second assembled configuration according to an embodiment.
Figure 11:
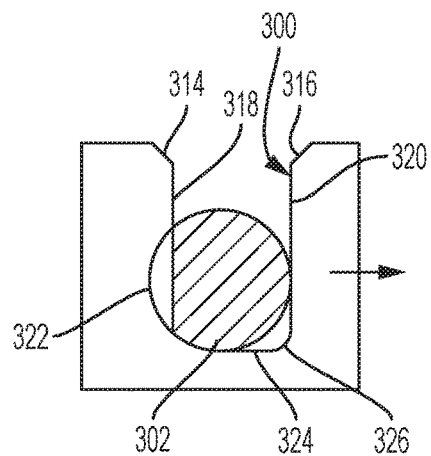
FIG. 11 depicts a partial, cross-section view of first side peg and slot of the mirror assembly in the second assembled configuration as shown in FIG. 10.
Figure 12:
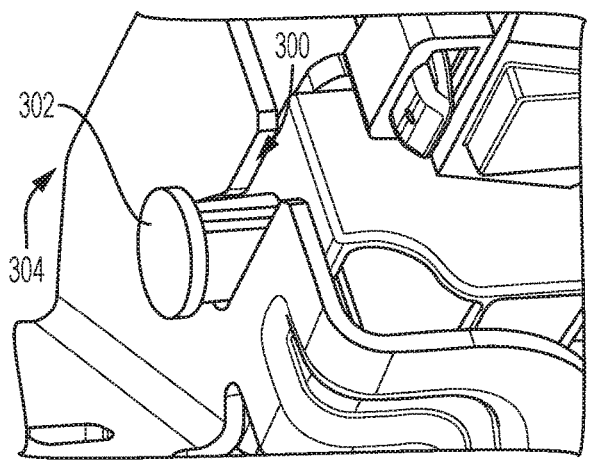
FIG. 12 depicts a perspective, side view of first side peg and a lot in the first assembled configuration shown in FIG. 8.

Another embodiment has slot 300 having a different profile than slot 204 and a first side peg 302 having a different structure than first side peg 202. These differences may avoid the unintended assembled configuration described above. FIGS. 8-12 depict mirror assembly 304 according to this other embodiment. These figures depict the interaction between first side peg 302 and slot 300 when mirror assembly 304 is in the assembled configuration. FIG. 8 depicts a fragmented, top view of first side peg 302 and slot 300 in a first assembled configuration. FIG. 9 depicts a partial, cross-section view of first side peg 302 and slot 300 in the first assembled configuration. FIG. 10 depicts a fragment, top view of first side peg 302 and slot 300 in a second assembled configuration caused by a lateral impact force. FIG. 11 depicts a partial, cross-section view of first side peg 302 and slot 300 in the second assembled configuration. FIG. 12 depicts a perspective, side view of first side peg 302 and slot 300 in the first assembled configuration.

As shown in FIGS. 8-12, first side peg 302 includes peg slot 306 and opposing bearing surface 308, base portion 310, and end cap 312. End cap 312 may be circular in shape. Base portion 310 may also be circular in shape. As depicted in the Figures, peg slot 306 is bounded by end cap 312 and base portion 310. The lower surface of peg slot 306 may be planar. In other embodiments, the lower surface of peg slot 306 may be arcuate. As shown in FIGS. 8-12, slot 300 includes front and rear upper chamfered portions 314 and 316 connecting to front and rear side portions 318 and 320, respectively. Slot 300 also includes front arcuate portion 322, which is connected to rear side portion 320 through bottom portion 324 and lower chamfered portion 326.

As shown in the first assembly configuration of FIGS. 8, 9 and 12, first side peg 302 rests on rear side portion 320 of slot 300 on bearing surface 308. As shown, bearing surface 308 is circular, but could have other arcuate profiles. A high lateral impact force (e.g., greater than or equal to 8 G, while this threshold may vary for different designs), as shown by arrow 164 of FIG. 2, causes mirror assembly 304 to shift in a lateral direction. Under this condition, the second assembly configuration as shown in FIGS. 10 and 11, first side peg 302 continues to rest on rear side portion 320 of slot 300 on bearing surface 308. After the high lateral impact is ends, mirror assembly 304 is free to move back to first assembly configuration. However, in either assembly configuration, contact between bearing surface 308 and slot 300 is maintained such that the force of tension spring 154, as shown by arrow 162 of FIG. 2, does not prevent mirror assembly 304 from returning to an intended assembled position. Accordingly, an unintended assembly position is not experienced in one or more embodiments due to a lateral force and the force of the tension spring.

Figure 13A:
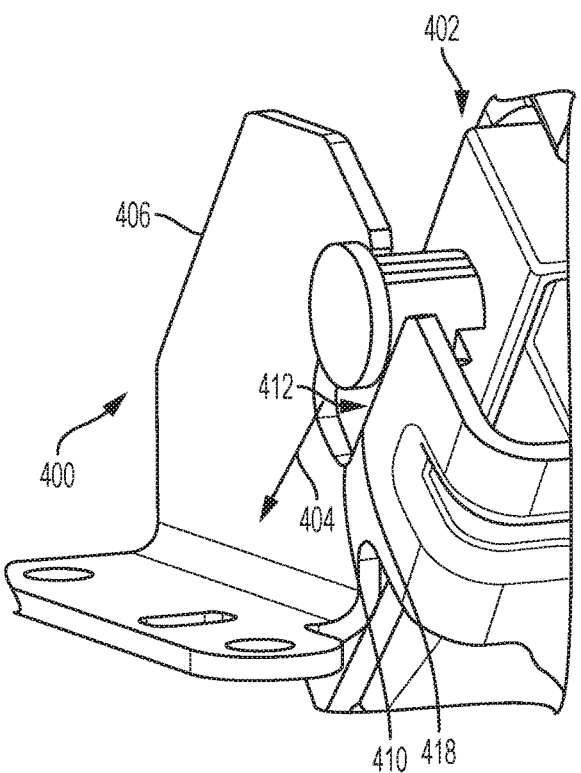
FIG. 13a depicts a perspective, side view of a mirror assembly during a first assembly step according to one embodiment.
Figure 13B:
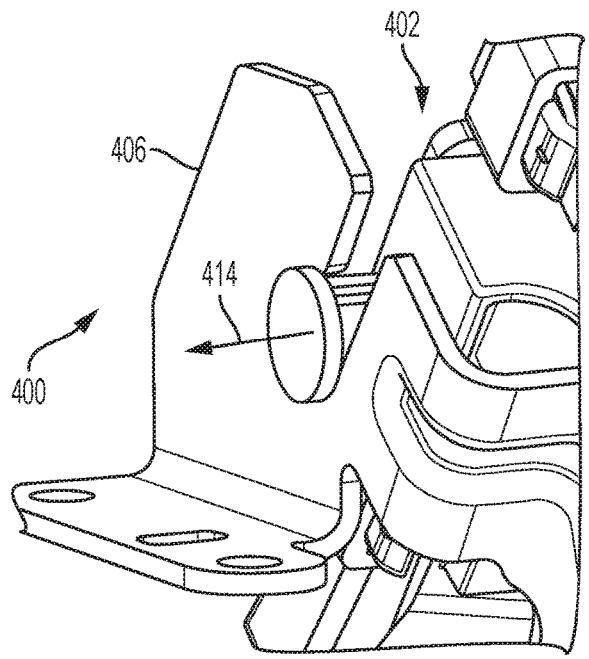
FIG. 13b depicts a perspective, side view of the mirror assembly of FIG. 13a during a second assembly step.
Figure 13C:
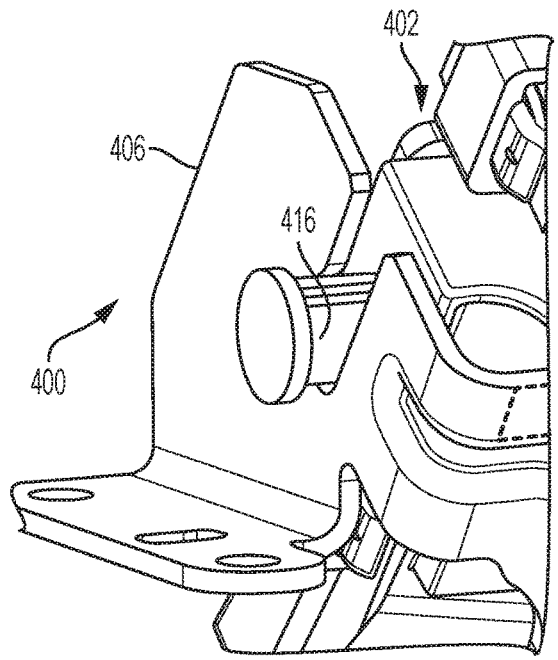
FIG. 13c depicts a perspective, side view of the mirror assembly of FIG. 13a in an intended final assembly configuration.

FIGS. 13a through 13c depict side, perspective views of mirror assembly 400 during an assembly process according to one or more embodiments. In a first assembly step, as depicted in FIG. 13a, mirror housing 402 (housing a HUD mirror) is translated in a downward, vertical direction, as depicted by arrow 404, relative to bracket 406. During the first assembly step, side peg 408 of mirror housing 402 becomes seated on lower surface 410 of slot 412. In a second assembly step, as depicted in FIG. 13b, mirror housing is translated in a lateral direction, as depicted by arrow 414, relative to bracket 406. During the second assembly step, bearing surface 416 of side peg 408 of mirror housing 402 becomes seated on rear surface 418 of slot 412, as shown in FIG. 13c, which is an intended final assembly configuration. In one or more embodiments, this two-axis (i.e., the axes of the downward, vertical direction and the lateral direction) assembly method prevents vertical and fore-aft movement of mirror housing 402 after completion of the assembly process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heads-up display (HUD) mirror assembly comprising:
a mirror having front and rear surfaces and extending along a longitudinal axis;
a housing having a peripheral frame portion and a rear body portion connected to each other to house the mirror such that the front surface of the mirror is exposed, and first and second pegs extending away from the peripheral frame portion and extending along the longitudinal axis;
a bracket having first and second mounting portions defining first and second slots, respectively, and a supporting arm extending therebetween;
a tension spring attached to the rear body portion and the supporting arm; and
a torsion spring exerting a holding force on the housing along the longitudinal axis from the second peg toward the housing,
the first peg bearing on the first slot on a bearing surface of the first peg when the mirror assembly is in first and second assembled configurations, the first peg includes a first peg slot opposite the bearing surface of the first peg, and the first peg slot includes a bottom surface having a flat portion, the first slot has a major axis and a minor axis, and the tension spring exerts a holding force in directions perpendicular and parallel to the major axis and along a first mounting portion.

2. The HUD mirror assembly of claim 1, wherein the bearing surface has an arcuate profile.

3. The HUD mirror assembly of claim 1, wherein the bearing surface has a constant profile.

4. The HUD mirror assembly of claim 1, wherein the first slot includes a chamfered portion extending from the bottom surface.

5. The HUD mirror assembly of claim 4, wherein the first slot includes a front arcuate portion and a rear side portion.

6. The HUD mirror housing of claim 5, wherein the front arcuate portion is connected to the rear side portion through the bottom surface and the chamfered portion.

7. The HUD mirror housing of claim 1, wherein the base portion of the first peg is circular in shape.

8. The HUD mirror assembly of claim 1, wherein the first peg bears on the first slot at first and second positions on the bearing surface of the first peg when the mirror assembly is in first and second assembled configurations, respectively, and the first and second positions are different positions.

9. A heads-up display (HUD) mirror housing comprising:
a peripheral frame portion extending along a longitudinal axis;
a rear body portion connected to the peripheral frame portion connected to each other to house a mirror such that a reflective surface of the mirror is exposed; and
first and second pegs extending away from the peripheral frame portion and extending along the longitudinal axis, the first peg having a first bearing surface configured to bear against a first bracket mounting slot when the HUD mirror housing is in an assembled configuration, the first peg includes a first peg slot opposite the bearing surface of the first peg, and the first peg slot includes a bottom surface having a flat portion, and the first peg terminates in an end cap.

10. The HUD mirror housing of claim 9, wherein the bearing surface has an arcuate profile.

11. The HUD mirror housing of claim 9, wherein the second peg has a second bearing surface configured to bear against a second bracket mounting slot when the HUD mirror housing is in the assembled configuration.

12. The HUD mirror housing of claim 9, wherein the first and second pegs are integrally formed with the rear body portion.

13. A method of assembling a heads-up display (HUD) mirror assembly including a mirror having front and rear surfaces extending along a longitudinal axis, a housing having a peripheral frame portion and a rear body portion connected to each other to house the mirror such that the front surface of the mirror is exposed, and first and second pegs extending away from the peripheral frame portion and extending along the longitudinal axis, and a bracket having first and second mounting portions including first and second slots, respectively, and a supporting arm extending therebetween, the first slot having a major axis and a minor axis, the method comprising:
translating the housing in a downward, vertical direction along the major axis such that the first peg becomes seated on a lower surface of the first slot; and
translating the housing in a lateral direction along the longitudinal axis and away from the bracket such that a bearing surface of the first peg becomes seated on the rear surface of the first slot.

14. The method of claim 13, further comprising attaching a tension spring to the rear body portion and the supporting arm so that the tension spring exerts a holding force on the first peg in a direction perpendicular the major axis and along the first mounting portion.

15. The method of claim 13, further comprising using a torsion spring to exert a holding force on the housing along and a moment about the longitudinal axis from the second peg toward the housing.

16. The method of claim 13, wherein the first peg includes a slot opposite the bearing surface.

17. The method of claim 16, wherein the slot of the first peg rides on a rear surface of the first slot of the first mounting portion during the first translating step.

18. The method of claim 16, wherein the slot of the first peg includes a bottom surface having a flat portion.

* * * * *